(12) United States Patent
David et al.

(10) Patent No.: US 7,536,608 B2
(45) Date of Patent: *May 19, 2009

(54) SYSTEM AND METHOD FOR USING NETWORK INTERFACE CARD RESET PIN AS INDICATION OF LOCK LOSS OF A PHASE LOCKED LOOP AND BROWNOUT CONDITION

(75) Inventors: Thomas Saroshan David, Austin, TX (US); Randall Kent Sears, Cedar Park, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/934,203

(22) Filed: Nov. 2, 2007

(65) Prior Publication Data

US 2008/0071959 A1 Mar. 20, 2008

Related U.S. Application Data

(63) Continuation of application No. 10/950,064, filed on Sep. 24, 2004, now Pat. No. 7,325,167.

(51) Int. Cl.
*G06F 11/00* (2006.01)

(52) U.S. Cl. .............................. 714/48; 714/14; 714/23; 714/44

(58) Field of Classification Search .................. 714/44, 714/48, 14, 23
See application file for complete search history.

(56) References Cited

U.S. PATENT DOCUMENTS

| | | | |
|---|---|---|---|
| 5,652,844 | A | 7/1997 | Harwood, III |
| 6,178,516 | B1 | 1/2001 | Meade |
| 7,325,167 | B2 * | 1/2008 | David et al. .................. 714/44 |
| 2001/0021956 | A1 | 9/2001 | Okamoto et al. |
| 2003/0035377 | A1 | 2/2003 | Ju |
| 2003/0196100 | A1 | 10/2003 | Grawrock et al. |
| 2004/0071159 | A1 | 4/2004 | Douglas et al. |
| 2004/0153726 | A1 | 8/2004 | Suzuki |
| 2004/0230873 | A1 | 11/2004 | Ward |

* cited by examiner

*Primary Examiner*—Emerson C Puente
(74) *Attorney, Agent, or Firm*—Howison & Arnott, L.L.P.

(57) ABSTRACT

A method for providing an indication from a network interface controller to a microcontroller is disclosed wherein upon occurrence of a particular condition within the network interface controller, an indication is provided from a reset pin of the network interface controller to the microcontroller unit. Upon receipt of the indication by the microcontroller unit, communications between the network interface controller and the microcontroller unit are inhibited.

15 Claims, 3 Drawing Sheets

SYSTEM AND METHOD FOR USING NETWORK INTERFACE CARD RESET PIN AS INDICATION OF LOCK LOSS OF A PHASE LOCKED LOOP AND BROWNOUT CONDITION

CROSS-REFERENCE TO RELATED APPLICATIONS

This application is a Continuation of U.S. Pat. No. 7,325,167, entitled SYSTEM AND METHOD FOR USING NETWORK INTERFACE CARD RESET PIN AS INDICATION OF LOCK LOSS OF A PHASE LOCKED LOOP AND BROWNOUT CONDITION issued on Jan. 29, 2008, incorporated herein by reference.

TECHNICAL FIELD OF THE INVENTION

The present invention relates to network interface controllers, and more particularly, to a network interface controller using a reset pin to indicate lock loss of a phase locked loop and a brownout condition.

BACKGROUND OF THE INVENTION

Ethernet controllers have evolved from the original network card type systems that provide network speeds of 2 Mb/s to 10 Mb/s, 100 Mb/s and up to current speeds of 1,000 Mb/s. The 2 Mb/s network interface cards have all but disappeared. Most network interface systems, or network interface cards (NIC), currently provide for three higher speeds, 10/100/1,0000 Mb/s. These are usually referred to as a 10 base T, 100 base T, and 1,000 base T, the "T" referring to a twisted pair physical media interface, other interfaces providing for the connection to optical fibers and the like. Each of the various configurations, at whatever speed, includes on an integrated circuit, a media side circuit or media access controller, the MAC, and a physical side circuit or physical layer, the PHY. The NIC is operable to provide timing and encoding/decoding for receiving data and transmitting data. Typically, when data is transmitted over the physical transmission line, such as an RJ 45 twisted wire cable, data will be received by the NIC from a processing system and this data is stored in a FIFO of some sort, encoded for transmission and then transmitted. For received data, the opposite operation occurs. These are well known circuits and fairly complex. At higher speeds, the core processing circuitry basically requires a digital signal processing (DSP) capability. Further, each network card will have associated therewith a unique address, such that it is unique to all other address cards and can be disposed on any network regardless of what other cards are disposed on the network. This is for the purpose of uniquely identifying any network device that is disposed on the network apart from other network cards. To facilitate this, a large block of numbers was originally created for the ethernet by a centralized standards body, which large block of numbers is considered to be an inexhaustible number.

The network interface cards further include an interrupt output and an interrupt register for providing an indication of interrupt problems between a network interface controller and an attached MCU. When an interrupt condition occurs, this information related to the interrupt condition is stored within an interrupt register of the NIC card, and an interrupt signal is sent from the NIC card to the attached MCU. Two conditions which generate an interrupt from the NIC card to the attached MCU are a loss of lock of the phase locked loop within the network interface card and the occurrence of a brownout condition within the network interface card. Brownout occurs when the voltage of the network interface card drops below 3.1 V. While each of these conditions will cause an interrupt to be generated from the network interface card to the attached MCU, during each of these conditions, the MCU is unable to communicate with the network interface card. Thus, while an interrupt will be received, there will be no way for the MCU to determine the cause of the interrupt, since the MCU will be unable to communicate with the network interface card. Thus, some manner for providing an indication to an MCU from an attached network interface card that does not require the MCU to communicate with the interrupt register of the network interface card is desired.

SUMMARY OF THE INVENTION

The present invention disclosed and claimed herein, in one aspect thereof, comprises a system and method for providing an indication from a network interface controller to a microcontroller unit. Upon detection of a condition by the network interface controller, an indication is provided from a reset pin of the network interface controller to the microcontroller unit. Upon receipt of the indication by the microcontroller unit, communications between the network interface controller and the microcontroller unit are inhibited.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
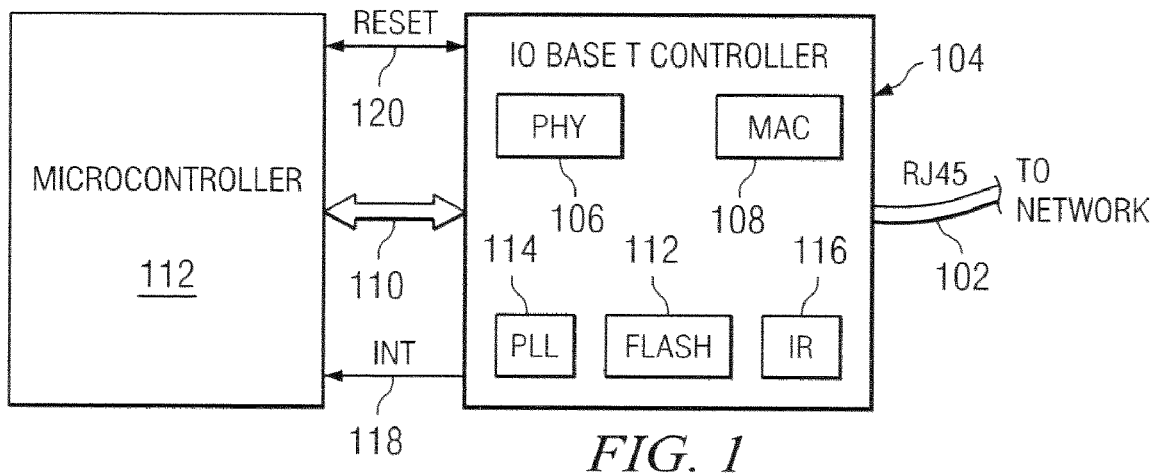
FIG. 1 illustrates a block diagram of a network controller interfaced with a microcontroller that provides some functionality for interfacing with peripherals and a network interface card.

Referring now to FIG. 1, there is illustrated a diagrammatic view of a network appliance that is operable to be disposed on a network. The network appliance is basically interfaced to a network with some type of physical cable 102. In an Ethernet environment, this would be an RJ45 cable. However, there could be other types of networks, even a wireless network. The physical cable is interfaced with a network interface controller 104. This controller 104 has associated therewith a physical layer section 106 that is labeled PHY. This provides for the encoding/decoding functions, the timing functions, etc., that are necessary to interface with the network through the particular physical media. For example, in an RJ45 cable, this is well known but different than for an optical cable, which would require a different set of timing rules, etc. The PHY 106 handles this encoding/decoding and timing. On the opposite side of the controller 104 is provided a media interface device 108, referred to as a Media Access Controller (MAC). Thus, data can be received on an input databus 110 from the media side, processed through the MAC 108 and the PHY 106 for transmission to the physical cable 102. Conversely, data can be received from the physical cable 102, processed by the PHY 106 and MAC 108 and output on the databus 110.

The databus 110 is connected to a microcontroller 112, which is a device that provides minimal processing in this application. It has a digital side to interface with the bus 110 and possibly some analog circuitry, such that the microcontroller 112 would constitute a mixed-signal device. Further, although not disclosed herein, the network controller 104 could have a network address that was definable on an even larger network such as a global communication network (GCN) that is typically referred to as the Internet.

Most Ethernet controllers will typically require some type of external memory to provide for storage of configuration information that will be loaded automatically at power-up. Typically, an EEPROM will be utilized, since it is both programmable and nonvolatile. The controller 104 has built therein non-volatile flash memory 112 that provides two functions. First, it provides for storage of configuration information on-chip. Second, as will be described in more detail herein below, it provides additional external microcontroller memory to allow minimal functionality microcontrollers with little memory additional accessible storage space. Thus, the microcontroller 112, during the operation thereof, can access the flash memory 112 within the controller 104 for the purpose of storing information thereof such as configuration information and such, and any other information necessary. This basically takes a very unsophisticated microcontroller and provides additional capabilities thereto.

The network interface controller 104 additionally includes a phase locked loop (PLL) 114. The phase locked loop 114 enables the synchronization of communications between the NIC 104 and the microcontroller 112. The PLL 114 provides an out-of-lock signal when the phase locked loop 114 is out of phase lock. When the phase locked loop 114 is out of phase lock communications between the microcontroller 112 and network interface controller 104 are not possible.

An interrupt register 116 stores indications of interrupt conditions that occur within the network interface controller 104. When an interrupt condition occurs, information describing the interrupt condition is stored within the interrupt register 116, and an interrupt indication is provided from the network interface controller 104 to the microcontroller 112 over an interrupt line 118. The microcontroller 112 may then access the network interface controller 104 and the interrupt register 116 over the communications bus 110 in order to determine the interrupt condition that has occurred. However, if the interrupt condition occurring within the network interface controller 104 is either the loss of phase lock of the phase locked loop 114 or the occurrence of a brownout condition where the voltage within the network interface controller 104 drops below 3.1 V, the network interface controller 104 will be unable to communicate with the microcontroller 112 over the communications bus 110. This will prevent the microcontroller 112 from determining the interrupt condition stored within the interrupt register 116.

According to the present disclosure, the occurrence of loss of lock in the phase locked loop 114 or a brownout condition will cause the network interface controller 104 to transmit an indication over the reset line 120 interconnecting the network interface controller 104 and microcontroller 112. Normally the reset line 120 is a unidirectional communication line wherein a reset signal is provided to the network interface controller 104 by the microcontroller 112 by pulling the signal on the reset line 120 low. According to the present disclosure, the network interface controller 104 may provide an indication to the microcontroller 112 of the occurrence of either a loss of lock by the phase locked loop 114 or the occurrence of a brownout condition by pulling the voltage on the reset line 120 low. If the microcontroller 112 detects the voltage on the reset line 120 going low, it knows that one of these two conditions has occurred. Thus, the reset line 120 is configured as a bi-directional line wherein a reset signal may be provided from the microcontroller 112 to the network interface controller 104, or an indication of the occurrence of a loss of lock by the phase locked loop 114 or a brownout condition may be provided from the network interface controller 104 to the microcontroller 112.

Figure 2:
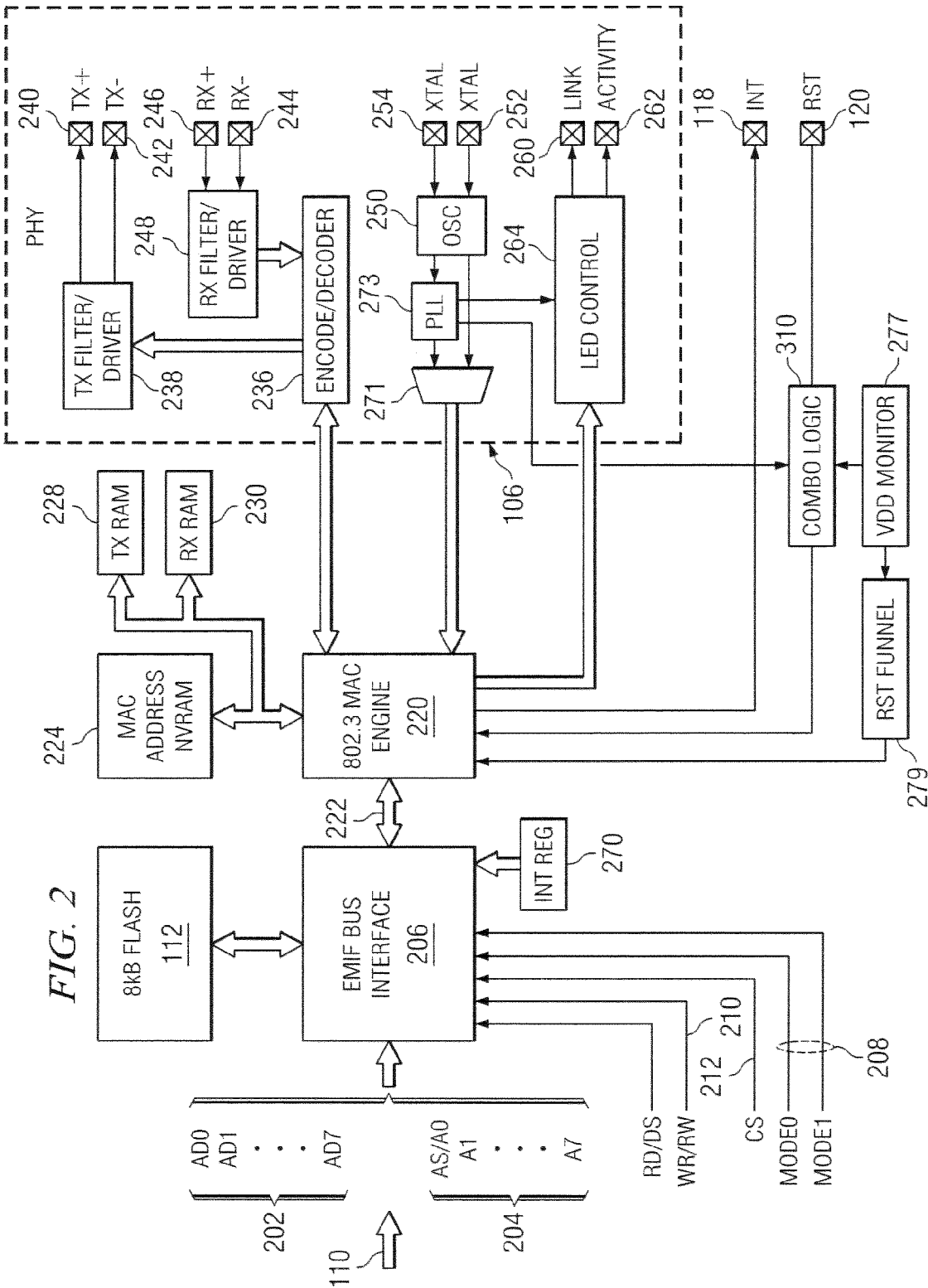
FIG. 2 illustrates a block diagram of the network controller.

Referring now to FIG. 2, there is illustrated a block diagram of the network interface controller 104. This network interface controller 104 is operable at the 10 Mb/s operating rate, such that it is a 10 BASE-T device and can be completely realized on a single chip. In so doing, the entire network interface controller 104 can be fabricated on a single chip with the on-chip flash. There is provided a databus 110 that constitutes the interface between the microcontroller 112 and the network interface controller 102. There is provided in the network interface controller 102 a data interface to the databus 110 that provides for both multiplexed and non-multiplexed operations. For the multiplexed operation, there are provided eight address/data pins 202. For a non-multiplexed operation, there are provided eight additional address pins 204. In the non-multiplexed operation, the pins 202 would be data pins and the pins 204 would be address pins. This configuration for interfacing with a databus utilizes the External Memory Interface (EMIF) format. This is a fairly standard interface that is utilized on different manufacturers' parts, wherein each manufacturer may have a slightly different format. The EMIF interface is provided with a bus interface block 206 that is operable to support one or two different manufacturers' EMIF memory interface formats, these being selected for convenience purposes. Also, this will provide both multiplexed and non-multiplexed formats. These formats are selected by two mode pins 208 that allow for the selection between multiplexed and non-multiplexed operation and also provides for two different interface formats. Only one mode pin is required for selecting between two different third party formats. The bus bandwidth will provide sufficient throughput for the 10 BASE-T throughput with a transaction speed that is less than 300 ns/transaction. Reads and Writes to various memory locations and registers are performed through using various EMIF command-addresses. For example, a Read from the location "RX_AUTO_INCREMENT" will perform a Read from the current receive buffer and will update a receive FIFO pointer. A Read or a Write from a "non-command" location will assume the location is a register that will provide the register Read value, i.e., data, on the EMIF databus at the relevant time. There will be provided Read/Write commands on a pin 210, a chip select command on a pin 212 and other commands that are necessary. In general, any type of interface could be provided that would allow external access to memory on the chip by the microcontroller 112. There is provided the flash memory 112 that is interfaced with the EMIF bus interface block 206. There is also provided a Media Access Control (MAC) engine 220 that is fully compliant with IEEE 802.3 Ethernet Standard (ISO/IEC 8802-3, 1993). This will basically handle all aspects of the Ethernet frame, transmission and reception, including:

collision detection, preamble generation detection, and CRC generation and tests. There may even be included various programmable features such as automatic re-transmission or collision and automatic padding of transmitted frames. The MAC engine 220 interfaces with the bus interface 206 through a bus 222. There will be provided a MAC address nonvolatile RAM 224 that interfaces with the MAC engine 220 for the operation thereof. This provides configuration information to the MAC for the operation thereof. Although illustrated as a separate memory location, the MAC address RAM 224 is basically part of the nonvolatile flash 112, albeit in an address location dedicated for storage of configuration information. There are also provided a 2 KB transmit RAM buffer 228 that is interfaced to the MAC engine 220 through a databus and a 4 KB receive RAM 230 that is interfaced to the MAC engine 220 through the databus. Data that is being transmitted will be stored in the transmit RAM 228 and data that is being received will be stored in the receive RAM 230 during the operation thereof.

The MAC engine 220 interfaces with the PHY 106. The PHY 106 includes an encoder/decoder 236 that is operable to receive data from the MAC engine 220 for encoding thereof and receive encoded data therefrom for transmission to the bus 110. Encoded data for transmission is output to a transmit filter/driver block 238 for transmission on two transmit terminals 240 and 242. Data is received on two separate wires at terminals 244 and 246. This configuration is for a physical RJ45 cable, in this disclosed embodiment, such that there are two dedicated transmit pins and two dedicated receive pins. They will be interfaced through a transformer to a transmission line. The received data, once received, is processed through a receive filter/driver block 248 for decoding of the data therein at the block 236. There is provided timing for the MAC engine with an oscillator 250 that typically will require an external crystal on pins 252 and 254.

Most Ethernet controllers will require, as part of the IEEE standard, LEDs that Indicate that there is a link and an LED that indicates that there is activity. The link LED is connected to a pin 260 and the activity LED is connected to a pin 262, both pins 260 and 262 controlled by an LED control block 264, which is controlled by the MAC engine 220.

The MAC engine 220 is also operable to generate an interrupt on a pin 266 and receive a reset on pin 268. As such, the MAC engine will be able to generate an interrupt to an external system that can utilize this interrupt to then access an interrupt register 270 for the purpose of determining what interrupt occurred. This interrupt register 270 represents two 8-bit registers.

In general, the receive interface is facilitated with the receive RAM 230, which is basically a 4K FIFO that can support up to eight Read packets. This 4K FIFO can be divided into a maximum of eight packet frames. The FIFO is written via hardware by the receive path of the MAC engine 220, and is read by software via the EMIF interface 206. The transmit interface is facilitated with the transmit RAM 228 that is a 2K single ported RAM buffer. This buffer will be written a byte at a time via the EMIF bus interface block 206 with the packet that is to be transmitted. Once the entire packet has been placed in this RAM 228, a "BEGIN_TX" bit is set which then begins a transmit session to the MAC engine 220. During transmission, a flag is set indicating that the transmit engine is busy. Once the transmission is complete, this bit will be cleared and an interrupt will be generated on the interrupt pin 266 indicating that the transmission has been completed. The transmit engine will support features such as transmitting a pause packet, applying back pressure (half duplex) and overriding the CRC and padding capabilities on a per packet basis. The packet based-transmission on collision, etc. is handled automatically with the MAC engine 220. Basically, transmission is facilitated by first writing the start address of the transmit packet (usually "x0000") to an address register. This is followed by writing data to a TX_AUTO_INCREMENT register location which will place the data in the location pointed to by the address register. Thereafter, transmission is initiated by writing the start address to the address register and then writing a "1" to the "TX_start" bit in the transmit control register.

The flash 112 can be accessed via the EMIF bus interface 206 for Reads and Writes. There are provided some ADDRH/L registers that should first be written with the starting address. Thereafter, an auto-increment Read can be performed or a single-byte Write (or Read) can be performed. Flash mass erases are typically not permitted by the user. These are protected by a lock and key mechanism that will prevent a user from deleting information accidentally. Another lock and key mechanism also protects Writes. Once unlocked, back-to-back Writes to the flash will be possible. To unlock a Write operation, it is necessary to perform back-to-back Write operations to a particular address with some predefined data which is the "key."

There are a number of flash interface registers that are contained in the bus interface. There is a FLASHLOCK register that is operable to perform Writes or page/mass erases with the address values A5, F1, which need to be written to this location consecutively. There is provided an INFOPGWR register that allows the performance of mass erases. To perform mass erases or to write to an information page, a code is required to be written consecutively to this location. There is provided a FLASH ERASE register which can allow for initiating a page erase or a mass erase. A FLASH STATUS register provides status information as to if the flash is having a page erase performed, being mass erased, a flash Write is occurring, the flash is busy or that the flash has been erased since the last reset. There is an ADDRH/L register that is an address register used to access the flash. To Read or Write flash, it is necessary to first write the address of the byte to be accessed in this location and then perform the auto-increment operation for Reads or the 1-byte operation for a Read or a Write, these being EMIF commands. With the auto-increment command, only the address of the first byte needs to be written, with subsequent Reads all incrementing this address.

A multiplexer 271 and phase locked loop 273 are connected between the MAC engine 220 and the oscillator 250. The multiplexer 271 comprises a two to one multiplexer having its first input connected to an output of the phase locked loop 273 and its second input connected to an output of the oscillator 250. The output of the multiplexer 271 is connected to an input of the MAC engine 220. The phase locked loop 273 has its output connected to the multiplexer 271 and its input connected to receive the clock signal from oscillator 250. Phase locked loop 273 multiplies up the clock signal provided by the oscillator 250. A clock select signal selects between the output of the phase locked loop 273 and the output of the oscillator 250 to provide a clock signal for the network interface controller. The phase locked loop 273 would also provide a loss of lock signal to indicate that the phase lock of the phase locked loop 273 has been lost. This loss of lock signal is provided to combinational logic 310 and may be used to provide an indication to the microcontroller unit 112 on the reset line 120. The VDD monitor 277 monitors the VDD voltage of the NIC 104. If the voltage falls below 3.1 V, a brownout condition signal is generated by the VDD monitor 277 and provided to the combinational logic 310. The VDD monitor also can provide a brownout reset signal to the RST Funnel 279.

Figure 3:
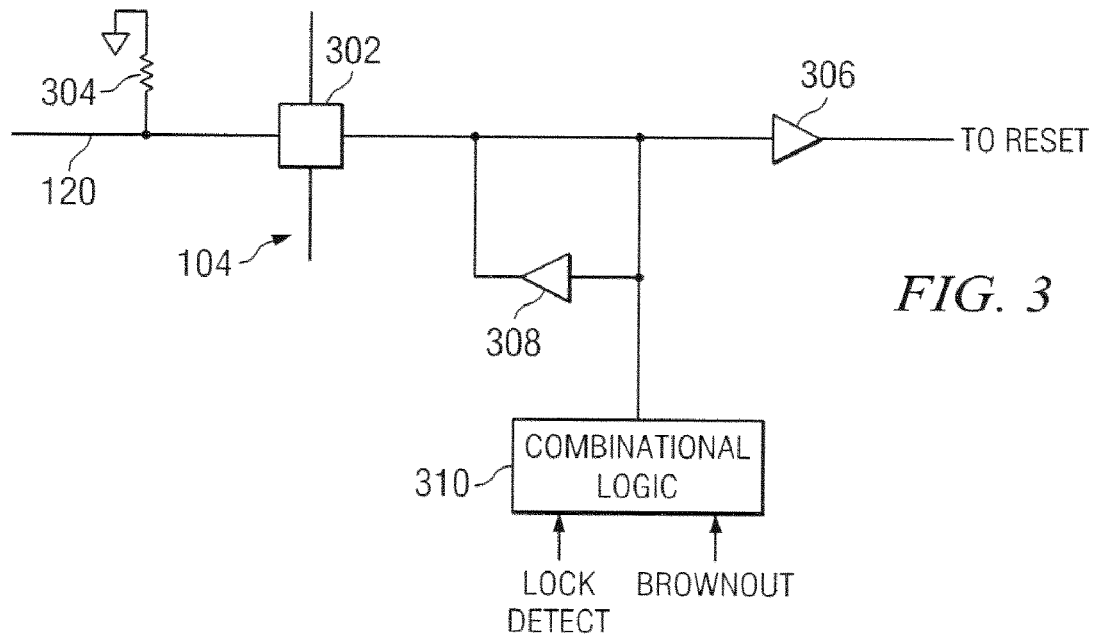
FIG. 3 illustrates a block diagram of the logic connected to the reset pin of the network interface card.

Referring now to FIG. 3, there is illustrated the connection of the driver circuitry for the reset (RST-bar) pin 302. The reset pin 302 is connected to the reset line 120. The reset line 120 is held actively high by a pull up resistor 304. Reset pin 302 of the network interface controller 104 is connected to an input line driver 306 through combinational logic 310 which is connected to the reset circuitry within the network interface controller 104. The reset pin 302 is also connected through combinational logic 310 to an output driver 308 for providing an output signal over the reset pin 302 to the reset line 120. The combinational logic is responsive to a lock detect signal from the phase locked loop and a brownout signal indicating the voltage of the network interface card has dropped below 3.1 V. As described previously, the lock detect signal would come from the phase locked loop 114. The brownout signal would be provided by the VDD monitor 277. The combinational logic 310 is configured such that the signal provided to the input of driver 308 and the input of driver 306 enable the reset line 120 to be pulled low by the network interface card 104 in response to an indication of a brownout condition by the brownout signal or a loss of lock by the lock detect signal. While the reset line 120 is pulled low, the output of driver 306 remains high in order to prevent the occurrence of a reset cycle within the network interface controller 104. Likewise, the combinational logic 310 enables the reset line 120 to be pulled low by the attached MCU to initiate a reset cycle to be initiated within the NIC 104. If a loss of phase lock or brown out occurs then an interrupt is signaled externally and a reset is generated internal to the chip.

Figure 4:
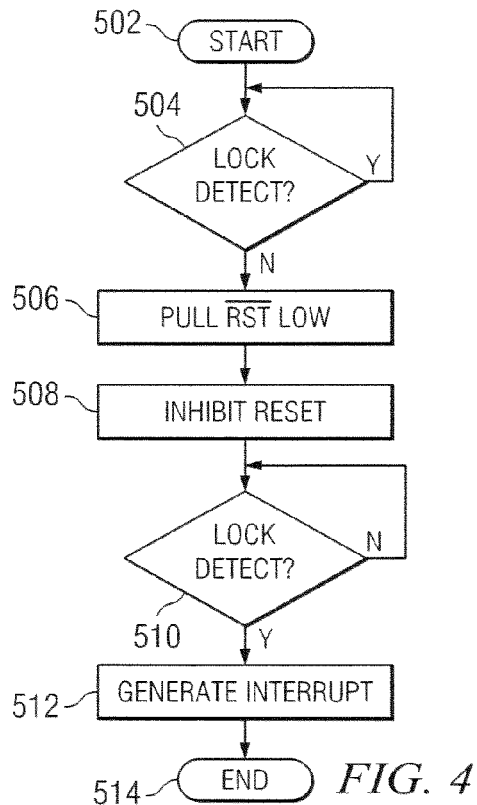
FIG. 4 is a flow diagram illustrating the operation of the network interface card responsive to a loss of phase lock of the phase locked loop of the network interface card.

Referring now to FIG. 4, there is illustrated a flow diagram describing the operation of the network interface card 104 wherein the reset pin is used to indicate a loss of lock in a phase locked loop 273. The process begins at step 502. Inquiry step 504 determines if there is a lock detect from the phase locked loop 273. If a lock exists, inquiry step 504 continues to monitor for the lock detect of the phase locked loop 273. If no lock detect is detected, the RST-bar pin is pulled low at step 506. Inquiry step 510 monitors for the lock detect signal and while the phase locked loop 273 remains out of lock, inquiry step 510 continues monitoring. Once inquiry step 510 detects that the phase locked loop 114 has re-entered phase lock, an interrupt is generated at step 512 to the microcontroller unit over interrupt line 118. The process ends at step 514.

Figure 5:
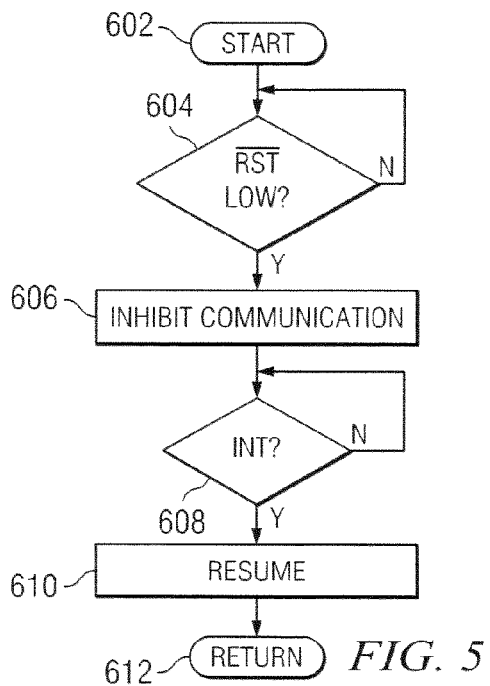
FIG. 5 is a flow diagram illustrating the operation of the microcontroller unit responsive to loss of a phase lock in the phase locked loop of the network interface card.

Referring now to FIG. 5, there is illustrated the operation of the microcontroller unit 112 responsive to the indication received from the network interface card 104 over the reset line 120. The process begins at step 602 and inquiry step 604 monitors the reset line at step 604 to determine if it has gone low. If not, inquiry step 604 continues monitoring until the reset line 120 goes low. Once the reset line goes low, the microcontroller unit 112 knows that a loss of phase lock has occurred and inhibits communications, at step 606, between the microcontroller unit 112 and the network interface controller 104. Inquiry step 608 begins monitoring for receipt of the interrupt signal 118 from the network interface controller 104. The interrupt signal provides an indication that the loss of lock condition has ended, thus enabling resumption of communications between the network interface controller 104 and the microcontroller 112. Inquiry step 608 continues monitoring if no interrupt signal is detected. Once the interrupt signal is detected by inquiry step 608, communications resume at step 610 between the microcontroller 112 and the network's interface card 104. The process returns to normal operation at step 612.

Figure 6:
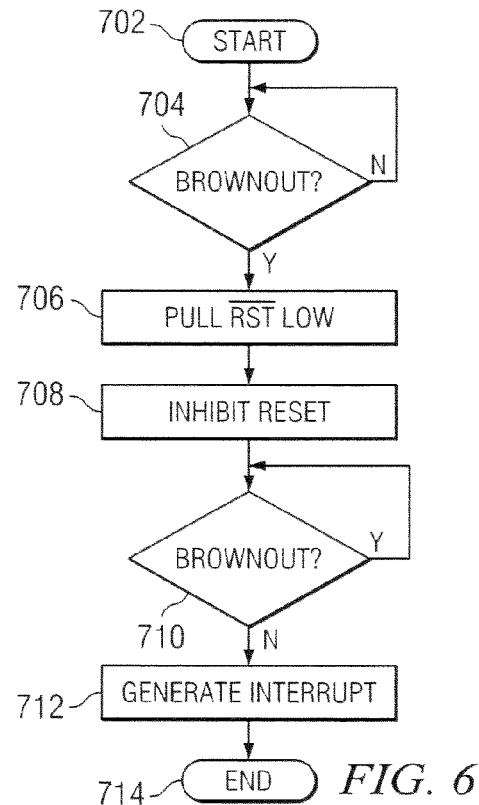
FIG. 6 is a flow diagram illustrating the operation of the network interface card during a brownout condition.

Referring now to FIG. 6, there is illustrated a flow diagram describing the operation of the network interface card 104 wherein the reset pin is used to indicate a brownout condition. The process begins at step 702. Inquiry step 704 determines if there is a brownout condition. If no brownout condition exists, inquiry step 704 continues to monitor for brownout. If a brownout condition is detected, the RST-bar line is pulled low at step 706. Inquiry step 710 monitors the brownout condition and while the brownout condition remains, inquiry step 710 continues monitoring. Once inquiry step 710 detects that brownout has ended, an interrupt is generated at step 712 to the microcontroller unit over interrupt line 118. The process ends at step 714.

Figure 7:
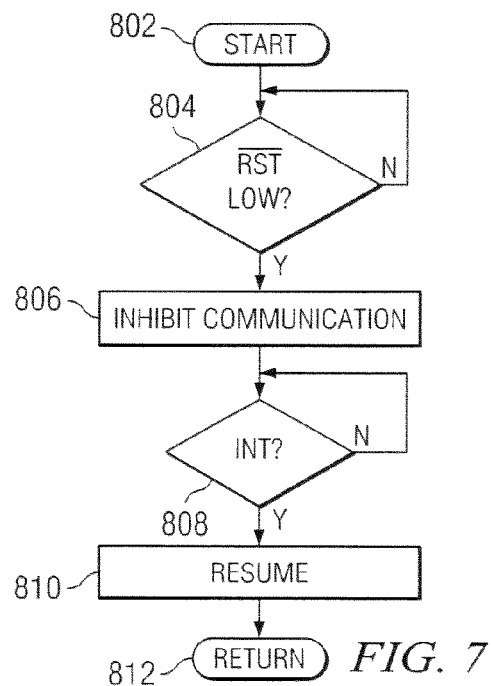
FIG. 7 is a flow diagram illustrating the operation of the microcontroller unit during a brownout condition.

Referring now to FIG. 7, there is illustrated the operation of the microcontroller unit 112 responsive to the brownout indication received from the network interface card 104 over the reset line 120. The process begins at step 802 and inquiry step 804 monitors the reset line at step 804 to determine if it has gone low. If not, inquiry step 804 continues monitoring until the reset line 120 goes low. Once the reset line goes low, the microcontroller unit 112 knows that a brownout condition has occurred and inhibits communications, at step 806, between the microcontroller unit 112 and the network interface controller 104. Inquiry step 808 begins monitoring for receipt of the interrupt signal 118 from the network interface controller 104. The interrupt signal provides an indication that the brownout condition has ended, thus enabling resumption of communications between the network interface controller 104 and the microcontroller 112. Inquiry step 808 continues monitoring if no interrupt signal is detected. Once the interrupt signal is detected by inquiry step 808, communications resume at step 810 between the microcontroller 112 and the network's interface card 104. The process returns to normal operation at step 812.

Although the preferred embodiment has been described in detail, it should be understood that various changes, substitutions and alterations can be made therein without departing from the scope of the invention as defined by the appended claims.

What is claimed is:

1. A method for providing an indication from a network interface controller of a condition that will cause the network interface controller to be reset and will prevent communication between the network interface controller and external circuitry, comprising the steps of:
   detecting occurrence of a condition in the network interface controller that would cause the network interface controller to be reset and which will substantially prevent communication between the network interface controller and the external circuitry;
   providing the indication from a reset pin of the network interface controller after detection of occurrence of the condition while, at substantially the same time, internally generating an internal reset to the network interface controller; and
   inhibiting attempts at communication between the network interface controller and the external circuitry by the external circuitry responsive to the step of providing the indication via initiation of the reset in the network interface controller.

2. The method of claim 1, wherein the condition comprises a lock loss for a phase locked loop.

3. The method of claim 1, wherein the condition comprises a brownout condition of the network interface controller.

4. The method of claim 1, wherein the step of providing further comprises the step of pulling a reset line connected to the reset pin from a first voltage level to a second voltage level.

5. The method of claim 1, further including the steps of:
    detecting occurrence of a second condition in the network interface controller; and
    providing an interrupt from the network interface controller to the microcontroller unit after detection of occurrence of the second condition.

6. The method of claim 5, wherein the second condition comprises a phase lock for a phase locked loop.

7. The method of claim 5, wherein the second condition comprises a non-brownout condition of the network interface controller.

8. A network interface controller for interfacing between a physical network and a media, comprising:
    a physical layer for receiving data for encoding and transmission to the physical network, and for receiving data from the physical network and decoding the received data;
    a media layer for receiving data from a microcontroller unit and converting the received data to a packet format and interfacing with said physical layer for transmitting packet formatted data thereto for encoding and transmission thereof, and for receiving decoded packet formatted data from said physical layer;
    a phase locked loop enabling synchronization of communication between the network interface controller and the microcontroller unit, said phase locked loop generating a signal indicating loss of phase lock;
    a reset pin providing a bidirectional interface between the network interface controller and the microcontroller unit; and
    combinational logic for providing an indication from the reset pin of the network interface controller responsive to the signal from the phase locked loop that the phase locked loop is operating in a mode that will prevent communication between the network interface controller and the microcontroller unit, and for providing at substantially the same time an internal reset signal to the network interface controller, wherein the indication provided via initiation of a reset in the network interface controller inhibits attempts at communication by the microcontroller unit between the network interface controller and the microcontroller unit.

9. The network interface controller of claim 8, wherein the combinational logic further pulls a reset line connected to the reset pin from a first voltage level to a second voltage level.

10. The network interface controller of claim 8, further includes circuitry for detecting occurrence of a second condition in the network interface controller, and providing an interrupt from the network interface controller to the microcontroller unit after detection of occurrence of the second condition.

11. The network interface controller of claim 10, wherein the second condition comprises a phase lock for a phase locked loop.

12. The network interface controller of claim 8, further including a VDD monitor for monitoring a VDD voltage of the network interface controller and for generating a brownout signal when the VDD voltage falls below a first level.

13. The network interface controller of claim 12, wherein the combinational logic further provides the indication from the reset pin of the network interface controller responsive to the brownout signal.

14. The network interface controller of claim 13, further includes circuitry for detecting occurrence of a second condition in the network interface controller, and providing an interrupt from the network interface controller to the microcontroller unit after detection of occurrence of the second condition.

15. The network interface controller of claim 14, wherein the second condition comprises a non-brownout condition.

* * * * *